United States Patent Office 3,842,083
Patented Oct. 15, 1974

3,842,083
DYES OF THE PERYLENETETRACARBOXYLIC
ACID DIIMIDE SERIES
Fritz Graser, Ludwigshafen, and Gerhard Kilpper, Mannheim, Germany, assignors to Badische Anilin- & Soda-Fabrik Aktiengesellschaft, Ludwigshafen (Rhine), Germany
No Drawing. Filed Sept. 5, 1972, Ser. No. 286,567
Claims priority, application Germany, Sept. 15, 1971,
P 21 46 027.5
Int. Cl. C07d 39/00
U.S. Cl. 260—281                                        6 Claims

ABSTRACT OF THE DISCLOSURE

Perylene - 3,4,9,10 - tetracarboxylic acid diimide dyes which bear on the imide groups pyrazole radicals of the formula:

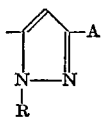

in which A is hydrogen or methyl; R is alkyl, unsubstituted or substituted phenyl, aralkyl or heteroalkyl of five to six members. The dyes color plastics brilliant orange shades having good light fastness.

---

This invention relates to new orange dyes of the perylene-3,4,9,10-tetracarboxylic acid diimide series and their use for mass coloration of plastics.

The new perylene-3,4,9,10-tetracarboxylic acid diimide dyes have the formula (I):

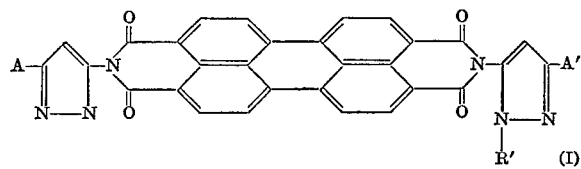

in which A and A' are hydrogen or methyl and R and R' are alkyl of one to twelve carbon atoms, phenyl which may bear chlorine, bromine, methyl, ethyl, methoxy and/or nitro as substituents, aralkyl of seven to seventeen carbon atoms which may bear chlorine, bromine, methyl, ethyl, methoxy and/or nitro as substituents in the aryl moiety, or a heterocyclic-substituted methyl radical of five or six members in the heterocyclic ring and in which A and A' and/or R and R' may be identical or different.

Alkyl of one to twelve carbon atoms (as R and R') may be methyl, ethyl, n-butyl, 2-ethylhexyl, 2-methylpentyl or n-nonyl, and phenyl may be p-nitrophenyl, preferably p-chlorophenyl or unsubstituted phenyl.

Suitable aralkyls of seven to seventeen carbon atoms which may bear substituents on the aryl moiety are: benzyl, 2-chlorobenzyl, 4-chlorobenzyl, 2,4-dichlorobenzyl, 2,6-dichlorobenzyl, 2-methoxybenzyl, 2,3-dimethoxybenzyl, 4-methylbenzyl, 2-methoxynaphthyl-1-methylene, pyrenylmethylene, 2-phenylpropyl, 3-phenylbutyl, 2,3-diphenylpropyl and suitable five- six-membered heterocyclic-substituted methyl radicals are furfuryl, α-picolyl and γ-picolyl, benzyl being particularly preferred.

The new dyes give clear, bright orange colorations in plastics having good to very good light fastness.

The dyes may be obtained by condensation of perylene-3,4,9,10-tetracarboxylic acid or anhydride which may bear one to four halogen atoms, such as chlorine, with the appropriate N-(1)-substituted 5-aminopyrazole of the formula (II):

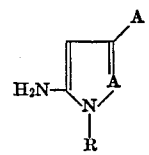

(in which A and R have the meanings given above) by a conventional method. The condensation may be carried out in an excess of the 5-aminopyrazole derivative which then acts as a solvent or preferably in a solvent or diluent such as quinoline, naphthalene or trichlorobenzene at elevated temperature, for example at a temperature of from 180° to 230° C. The reaction is advantageously carried out in the presence of an agent which accelerates the condensation such as zinc chloride, zinc acetate, zinc propionate or hydrochloric acid in the form of the hydrochloride of the aminopyrazole. The 5-aminopyrazole derivatives are conveniently used in excess. A mixture of different 5-aminopyrazole derivatives may also be used and mixed dyes are then obtained.

The dyes are isolated from the reaction mixture by a conventional method, for example by filtration. It is advantageous to filter the dyes at elevated temperature such as 80° to 120° C., with or without diluting the reaction mixture with inert solvents such as alcohols, for example methanol, ethanol or isobutanol, lower carboxamides, for example formamide or aromatic solvents such as toluene or chlorobenzene. In some cases the dye obtained are fairly easily soluble in which case filtration is advantageously carried out at lower temperature and solvents are used which dissolve less well, for example the alcohols. To remove any traces of perylenetetracarboxylic acid present, the dyes may be boiled up with dilute caustic soda solution or sodium carbonate solution. If desired the dyes may be purified by dissolving them in sulfuric acid and reprecipitating them or by recrystallization.

Examples of 5-aminopyrazole derivatives of the formula (II) are:

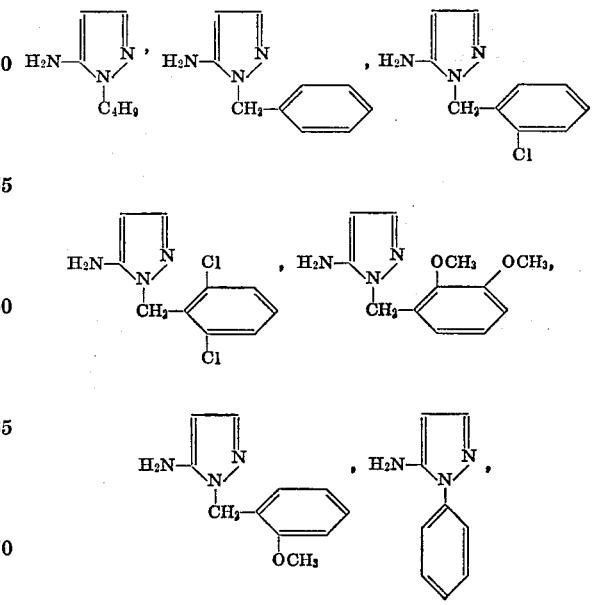

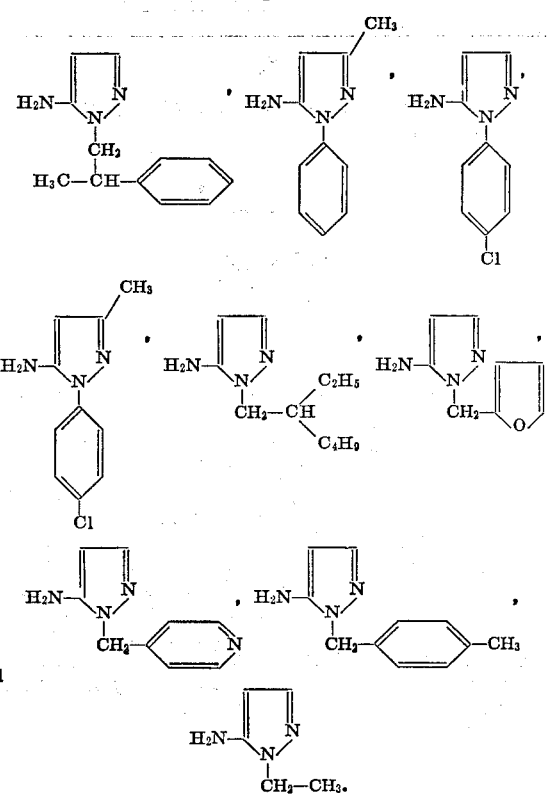

Dyes of the formula (I) in which A and A' are hydrogen or preferably hydrogen or methyl and R and R' are alkyls of two to nine carbon atoms, benzyl, p-chlorophenyl or particularly phenyl are of particular interest. Dyes of the formula (I) in which A and A' are hydrogen and R and R' are phenyl, n-butyl or benzyl are particularly preferred. The new dyes are eminently suitable for mass coloring plastics. They give very clear, bright orange colorations which, particularly in transparent applications, have an orange fluorescence. In spite of the fluorescence these dyes have good to very good light fastness. The dyes may also be used mixed with other dyes for coloring plastics, the fluorescence increasing the brilliance of the coloration.

It is surprising that bright orange shades which fluoresce in daylight in the case of transparent applications should be obtained with the dyes according to the invention because perylenetetracarboxylic acid-3,4,9,10-bisarylimides and the known bisheterocyclic imides of perylenetetracarboxylic acid usually give cloudy and not very clear red colorations in plastics. It is moreover surprising that the new dyes of this invention are much better soluble in plastics than the above-mentioned bisarylimides and bisheterocyclic imides. As a result of the better solubility, a much better distribution of the new dyes in plastics can be achieved so that prior to use special fine dispersion and finishing operations, such as the production of special formulations, are not essential.

The plastics may be thermoplastic or thermosetting. Examples of thermoplastics are polyvinyl chloride, polyethylene, polypropylene, polycarbonates, cellulose esters, polyacrylates, polyamides, polyacrylonitrile and especially polystyrene and the copolymers of styrene with butadiene, acrylonitrile and/or acrylic esters. Examples of thermosetting plastics are polyester resins and alkyl resins.

The new dyes are moreover suitable for dope dyeing of thermoplastics. The dyes may also be used as pigments for coloring printing inks, distempers or paints of all types.

The examples illustrate the invention.

Parts and percentages hereinafter specified are by weight.

EXAMPLE 1

34 parts of crystalline zinc acetate, 98 parts of perylenetetracarboxylic acid and 103 parts of 1-phenyl-5-aminopyrazole are introduced at 100° C. into 700 parts of quinoline. While passing a weak current of nitrogen over the whole it is heated to 225° C. and kept at 225° to 230° C. until a sample withdrawn and worked up no longer indicates perylene tetracarboxylic acid when boiled up with dilute sodium carbonate solution. This is the case after about two hours. The whole is cooled to about 100° C., filtered and washed first with quinoline, then with methanol and finally with water. The filter cake is stirred with about 600 parts of 2% aqueous sodium carbonate solution, heated to about 95° C., filtered and washed until neutral. Traces of perylenetetracarboxylic acid which may be present are thus removed. 100 parts of dye is obtained in very pure form. It dyes polystyrene very bright fluorescent yellow-orange shades.

EXAMPLE 2

0.05 part of dye obtained according to Example 1 is mixed in a tumbler mixer with 100 parts of ground polystyrene block polymer in the dry state. The mixture is melted and homogenized in a screw extruder at a barrel temperature of 200° to 250° C. The colored plastic material is granulated hot at the orifice or cold in the form of threads. The granules are then injection molded at 200° to 250° C. or press-molded into any desired shape. Bright yellow orange moldings are obtained having very good light fastness and fluorescing in a similar shade.

A polystyrene emulsion polymer or suspension polymer or a copolymer with butadiene and acrylonitrile or acrylic esters may be used instead of a polystyrene block polymer.

EXAMPLE 3

0.2 part of the dye of Example 1 is mixed with 100 parts of ground polystyrene block polymer and 1 part of titanium dioxide as described in Example 2. The mixture is fused, homogenized and granulated. The granules thus obtained are injection or press molded, the processing temperature being 200° to 250° C. Bright orange moldings having very good fastness properties are obtained.

By following the procedure described in Example 1 but using (instead of 103 parts of 1-phenyl-5-aminopyrazole) the number of parts specified in the following table of the 5-aminopyrazole compounds specified in column Y (which may be obtained as described in German printed application No. 1,295,560) dyes are obtained in a very good yield which when used for dyeing in accordance with Example 2 have the shade indicated in column Z. The colorations fluoresce in daylight and have good to very good fastness properties.

| Example No. | Parts | Y | Z |
| --- | --- | --- | --- |
| 4 | 100 | 1-n-butyl-5-aminopyrazole | Orange. |
| 5 | 103 | 1-benzyl-5-aminopyrazole | Do. |
| 6 | 125 | 1-p-chlorophenyl-5-aminopyrazole | Do. |
| 7 | 112 | 1-phenyl-3-methyl-5-aminopyrazole | Do. |
| 8 | 103 | 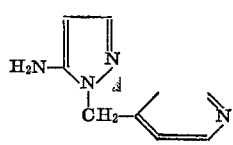 | Yellow orange. |

TABLE—Continued

| Example No. | Parts Y | | Z |
|---|---|---|---|
| 9 | 103 | 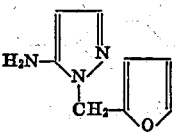 | Yellow orange. |
| 10 | 115 | 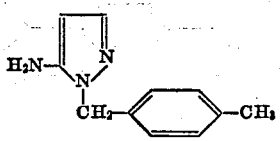 | Orange. |
| 11 | 115 | 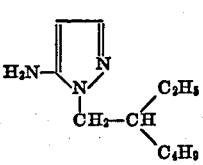 | Do. |
| 12 | 125 | 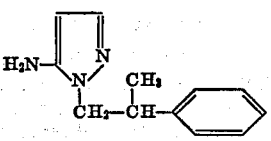 | Do. |
| 13 | 100 | 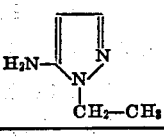 | Do. |

EXAMPLE 14

0.1 part of dye obtained according to Example 1 is homogenized with 100 parts of polyvinyl chloride powder (suspension or emulsion polymer) and 2 parts of dibutyl tin-bis-thioglycolic acid hexyl ester on mixing rollers at 140° to 150° C. for about eight minutes. The rolled sheet obtained is pressed into plates on a platen press at 140° C. and about 0.4 kg./cm.². Transparent bright orange moldings are obtained.

EXAMPLE 15

0.1 part of dye obtained according to Example 1 is homogenized with 100 parts of polyvinyl chloride powder (suspension or emulsion polymer), 1 part of titanium dioxide (rutile) and 2 parts of dibutyl tin-bis-thioglycolic acid hexyl ester on mixing rollers as described in Example 14 and then press-molded into boards. Clear orange moldings are obtained.

EXAMPLE 16

The procedure described in Example 1 is followed but 106 parts of monochloroperylene-3,4,9,10-tetracarboxylic anhydride is used instead of 98 parts of perylene-3,4,9,10-tetracarboxylic acid. A very similar dye to that according to Example 1 is obtained.

Monochloroperylene - 3,4,9,10 - tetracarboxylic anhydride is prepared as follows:

100 parts of perylene-3,4,9,10-tetracarboxylic anhydride is heated in 700 parts of nitrobenzene with 12 parts of iodine and 390 parts of sulfuryl chloride to 65° to 70° C. and stirred at this temperature for two hours. The mixture is then heated to 80° to 85° C. and kept at this temperature for another seven hours. After cooling filtration is carried out and the residue is washed with methanol and water and then dried. A good yield of a perylene-3,4,9,10-tetracarboxylic anhydride is obtained having a chloride content of 8.9%. This is equivalent to a monochloroperylenetetracarboxylic anhydride.

EXAMPLE 17

(a) 30 parts of the dye obtainable according to Example 7 is dissolved in 600 parts of 96% sulfuric acid at 0° to 6° C. Precipitation is then carried out on a mixture of water and ice so that a temperature of 10° C. is not exceeded. After filtration and washing neutral with water, the product is suction filtered and an aqueous dye paste is thus obtained having a solids content of about 17%.

(b) 118 parts of the 17% dye paste obtained according to (a) is processed with 64 parts of a solvent-free alkyd resin modified with soy bean oil and 16 parts of bis-ethylhexyl phthalate into a full color paste by flushing on a three roller mill with six passages at 60 atmospheres gauge.

(c) 66 parts of binder obtained by mixing 70 parts of solvent-free alkyd resin modified with soya bean oil, 17.5 parts of bisethylhexyl phthalate and 12.5 parts of a solvent-free melamine resin, is ground with 30 parts of titanium dioxide (rutile) and 4 parts of colloidal silicon dioxide on a three roller mill at 60 atmospheres gauge with six passages to form a titanium dioxide paste.

(d) 0.4 part of the full color paste prepared according to (b) and 5 parts of the titanium dioxide paste prepared according to (c) are mixed and ground fine an a plate-type triturator. A paint coating is prepared with this dye paste and this is baked for forty-five minutes at 120° C. A brilliant clear red coloration is obtained with good fastness properties.

EXAMPLE 18

1 part of the full color paste obtained according to Example 3(b) is mixed and ground on a plate-type triturator with 3 parts of a binder obtained by mixing 70 parts of solvent-free alkyd resin modified with soya bean oil, 17.5 parts of bisethylhexyl phthalate and 12.5 parts of a solvent-free melamine resin. A coating is prepared with this dye paste and baked for forty-five minutes at 120° C. A very transparent, deep colored, brilliant red coloration is obtained having good fastness properties.

We claim:
1. A perylene-3,4,9,10-tetracarboxylic acid diimide dye of the formula

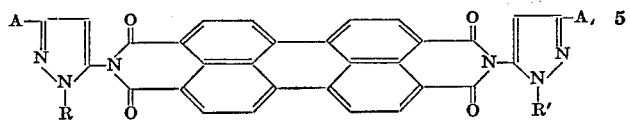

in which: A and A' are hydrogen or methyl; and R and R' are primary or secondary alkyl of one to twelve carbon atoms; phenyl which is unsubstituted or which bears a substituent selected from the group consisting of chlorine, bromine, methyl, ethyl, methoxy and nitro; phenylalkyl of seven to ten carbon atoms which is unsubstitiuted or which bears up to two substituents in the phenyl moiety selected from the group consisting of chlorine, bromine, methyl, ethyl, methoxy and one nitro; or a heterocylic-substituted methyl selected from the group consisting of furfuryl, α-picolyl and γ-picolyl.

2. A dye of the formula according to claim 1 in which A and A' are hydrogen or methyl and R and R' are alkyl of two to nine carbon atoms, benzyl, p-chlorophenyl or phenyl, A is the same as A' and R is the same as R'.

3. The dye of the formula:

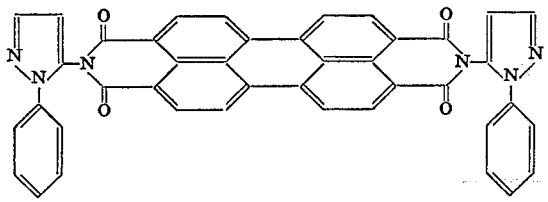

4. The dye of the formula:

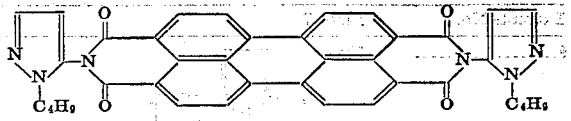

5. The dye of the formula:

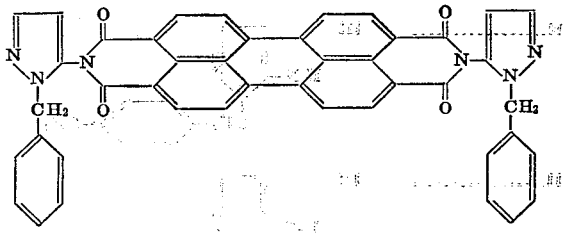

6. The dye of claim 1 in which A and A' are hydrogen and R and R' are phenyl, n-butyl or benzyl.

References Cited
UNITED STATES PATENTS

| | | | |
|---|---|---|---|
| 3,554,776 | 1/1971 | Gerson et al. | 106—288 Q |
| 3,647,798 | 3/1972 | Klein | 260—281 |
| 3,332,931 | 7/1967 | Braun | 260—281 |
| 3,357,983 | 12/1967 | Weener et al. | 260—281 |

DONALD G. DAUS, Primary Examiner

M. C. VAUGHN, Assistant Examiner

U.S. Cl. X.R.

106—288 Q; 260—37 N, 37 P, 345.2

UNITED STATES PATENT AND TRADEMARK OFFICE
CERTIFICATE OF CORRECTION

PATENT NO. : 3,842,083
DATED : October 15, 1974
INVENTOR(S) : Fritz Graser and Gerhard Kilpper It is certified that error appears in the above-identified patent and that said Letters Patent are hereby corrected as shown below:

Column 2, line 3-13, the lower "A" should be --N-- in the structural formula;

Column 2, line 34, "dye" should be --dyes--.

Signed and Sealed this thirtieth Day of December 1975

[SEAL]

Attest:

RUTH C. MASON
Attesting Officer

C. MARSHALL DANN
Commissioner of Patents and Trademarks